(12) United States Patent
Iijima et al.

(10) Patent No.: US 6,576,584 B1
(45) Date of Patent: Jun. 10, 2003

(54) METHOD FOR PRODUCING HYDROTREATING CATALYST

(75) Inventors: Masahiko Iijima, Ohi-Machi (JP); Takao Hashimoto, Higashimatuyama (JP); Yoshinobu Okayasu, Ohi-Machi (JP); Takeshi Isoda, Niiza (JP)

(73) Assignee: Tonen Corporation, Saitama (JP)

(*) Notice: Subject to any disclaimer, the term of this patent is extended or adjusted under 35 U.S.C. 154(b) by 28 days.

(21) Appl. No.: 09/652,950

(22) Filed: Aug. 31, 2000

(30) Foreign Application Priority Data

Oct. 7, 1999 (JP) .......................... 11-287425

(51) Int. Cl.$^7$ ....................... B01J 23/882; B01J 23/883; B01J 37/03; C01G 45/08
(52) U.S. Cl. ............. 502/202; 502/208; 502/232; 502/254; 502/257; 502/259; 502/260; 502/305; 502/314; 502/315; 502/325; 502/332; 502/337
(58) Field of Search ............. 502/202, 208, 502/232, 254, 257, 258, 259, 260, 305, 315, 314, 325, 337, 332

(56) References Cited

U.S. PATENT DOCUMENTS

| | | | | |
|---|---|---|---|---|
| 3,920,539 A | * | 11/1975 | Hamner et al. | 208/216 PP |
| 3,983,029 A | * | 9/1976 | White | 208/111.01 |
| 4,287,050 A | | 9/1981 | Eastman et al. | 208/215 |
| 4,861,460 A | * | 8/1989 | Kemp | 208/216 PP |
| 5,152,885 A | | 10/1992 | Singhai et al. | 208/254 |
| 5,182,250 A | * | 1/1993 | Usui et al. | 502/314 |
| 6,093,309 A | * | 7/2000 | Seamans et al. | 208/111.3 |
| 6,267,874 B1 | * | 7/2001 | Iijima et al. | 208/111.3 |

FOREIGN PATENT DOCUMENTS

| | | |
|---|---|---|
| EP | 0177198 B1 | 8/1991 |
| EP | 0448117 A1 | 9/1991 |
| EP | 0512835 A1 | 11/1992 |
| EP | 0748652 A1 | 12/1996 |
| JP | 62241252 | 10/1987 |
| JP | 03278840 | 12/1991 |
| JP | 06226101 | 8/1994 |

* cited by examiner

Primary Examiner—Ngoc-Yen Nguyen
(74) Attorney, Agent, or Firm—James H. Takemoto; Gerard J. Hughes; Jeremy J. Kliebert

(57) ABSTRACT

A method for producing a hydrotreating catalyst which relates to the production of a solid catalyst composed of a carrier impregnated with an active component, to give a catalyst for hydrotreating hydrocarbon oils, which contains a large quantity of a hydrogenation-active component and uniform, crystalline composite metal compound, and shows high catalytic activity.

18 Claims, No Drawings

METHOD FOR PRODUCING HYDROTREATING CATALYST

CROSS-REFERENCE TO RELATED APPLICATIONS

This application claims priority to Japanese Patent Application No. 287425/1999, filed Oct. 7, 1999, which is incorporated herein by reference.

FIELD OF THE INVENTION

This invention relates to a method for producing a hydrotreating catalyst for a hydrocarbon oil, more particularly to a method for producing a multi-component solid hydrotreating catalyst containing a uniform, crystalline, composite metal compound, prepared by simultaneous precipitation and accompanying coprecipitation of the catalyst components from the mixture containing at least one hydrogenation-active component.

BACKGROUND OF THE INVENTION

Solid catalysts for chemical reactions normally comprise a carrier on which one or more active components are deposited by impregnation, vapor deposition or the like. In oil refining, various types of catalysts have been proposed for hydrotreating hydrocarbon oils, e.g., those with one or more hydrogenation-active components deposited in two stages on a refractory inorganic oxide. The refractory inorganic oxides useful as the carrier include alumina, silica-alumina, magnesia and zirconia, and useful hydrogenation-active metal components include at least one of the group 6A and group 8 metals, such as molybdenum, tungsten, cobalt and nickel, in particular a combination of the group 6A and group 8 metals, such as molybdenum-cobalt, molybdenum-nickel and molybdenum-cobalt-nickel.

The basic characteristics a solid hydrotreating catalyst is required to exhibit include high reactivity and activity maintenance, for which the active sites of the active metal component must be dispersed uniformly and extensively. Therefore, the essential properties of the catalyst are large specific surface area and pore volume. For such a catalyst to be realized, it is necessary to provide a carrier of large specific surface area and pore volume, and to keep these essential properties while it is deposited with an active metal component. One of the disadvantages involved in the two-stage process, which has been developed so far to produce solid catalysts, is weak bond between the active metal component and carrier, because the carrier is impregnated with a solution of the active component, with the result that it is merely adsorbed or precipitated on the carrier. As a result, the active metal component is highly mobile during the catalyst production process from adsorption or precipitation to completion of drying, making it difficult to disperse the active metal component uniformly and extensively. Another disadvantage is limited content of the active component and hence limited catalyst activity, because the active component is immobilized on the carrier already prepared, by which is meant that content of the active component is limited by total pore volume of the carrier.

In an attempt to solve the above problems, Japanese Laid-open Patent Application No. 83603/1986 discloses a method for producing the solid catalyst involving no independent carrier production step, in which an oxygenated organometallic compound dissolved in a polar compound as the solvent is hydrolyzed, and the resultant sol is gelled. However, this method involves several problems; (1) the uniform sol (colloidal solution) prepared by the hydrolysis must be totally gelled, which limits ratio of the oxygenated compound to the polar compound, (2) it is difficult to produce a high-density or high-strength compound metal oxide, when the whole sol is to be gelled, which makes this method unsuitable for production of practical hydrotreating catalysts required to be serviceable for extended periods, and (3) the active metal component is substantially limited to an easily reducible metallic compound which forms a precipitate by hydrolysis with water, and another compound is difficult to use, even though it is soluble in the hydrolysis effluent solution, and (4) the gel formed by the gelation process is agar-like, difficult to be uniform by agitation, causing insufficient or incomplete hydrolysis. On the other hand, when the mixing ratio is high enough to allow sufficient agitation, the agar-like gel cannot be continuously discharged from the vessel to totally gel the sol. This method, therefore, has not been used for production of high-activity hydrotreating catalysts, because of the above difficulties which make it unsuitable for commercial production of the catalyst.

Recently, reduction of sulfur content of gas oil is strongly required for environmental reasons, especially by deep desulfurization of stocks of high sulfur contents, e.g., light gas oil (LGO), vacuum gas oil (VGO) and cracked gas oil. In particular, sulfur content of diesel fuel is required to be reduced to 0.05 wt. % or lower. It is now considered that whether this is achieved or not largely depends on whether sulfur compounds difficult to remove, e.g., 4-methyl dibenzothiophene and 4-6-dimethyl dibenzothiophene, are efficiently desulfurized by development of high-activity catalysts.

It would be desirable to provide a method for producing a solid catalyst, in particular hydrotreating catalyst which exhibits high activity in desulfurization, denitrogenation, dearomatization and the like for hydrotreating hydrocarbon oils, which exhibits high activity maintenance for the above reactions, and that has an increased content of hydrogenation-active component dispersed uniformly and extensively, and large specific surface area and pore volume.

SUMMARY OF THE INVENTION

Knowing that the conventional two-stage process used for producing the solid catalysts has a limitation of further increasing catalyst activity, the inventors of the present invention have extensively pursued methods which give a catalyst with an active component high in homogeneity and dispersibility without separating the carrier production and active component deposition steps from each other, to find that all of the catalyst components (a), ($b_1$) and ($b_2$) of different precipitation characteristics can be simultaneously precipitated by dissolving these catalyst components uniformly in a non-aqueous solvent and adding a precipitant solution to the above solution for simultaneous precipitation and accompanying coprecipitation.

The present invention relates to a method for producing a hydrotreating catalyst, which comprises (1) dissolving catalyst components (a), ($b_1$) and ($b_2$), wherein said catalyst components are defined as:
  (a) (i) an aluminum compound soluble in a non-aqueous solvent, or
  (ii) a mixture of the above aluminum compound and at least one of the compounds selected from silicon, phosphorus and boron, soluble in the above solvent,
  ($b_1$) at least one of the compounds selected from group 6A metals, and ($b_2$) at least one of the compounds selected from group 8 metals in a non-aqueous solvent to form a homogeneous solution, (2) preparing a gel slurry from the homogeneous solution by adding a precipitant solution to the homogeneous solution, and (3) drying and calcining the gel slurry to form a homogeneous, crystalline composite metal compound.

Another embodiment relates to a method for producing a hydrotreating catalyst, which comprises (1) dissolving at least one of catalyst components (a), ($b_1$) and ($b_2$), wherein said catalyst components are defined as:

(a) (i) an aluminum compound soluble in a non-aqueous solvent, or
   (ii) a mixture of the above aluminum compound and at least one of the compounds selected from silicon, phosphorus and boron, soluble in the above solvent, ($b_1$) at least one of the compounds selected from group 6A metals, and ($b_2$) at least one of the compounds selected from group 8 metals in a non-aqueous solvent to form a homogeneous solution, (2) preparing a gel slurry from the homogeneous solution by adding a precipitant solution further containing any remaining catalyst components not added to the non-aqueous solvent in step (1) to the homogeneous solution, and (3) drying and calcining the gel slurry to form a homogeneous, crystalline composite metal compound.

The present invention for producing a multi-component, simultaneously precipitated solid catalyst for hydrotreating, is applicable to all types of the reactions proceeding when a hydrocarbon oil is brought into contact with hydrogen, in particular hydrofining, hydrodesulfurization, hydrodenitrogenation, hydrodearomatization, hydroisomerization, hydrocracking, hydrodewaxing, hydrodemetallization and the like.

DETAILED DESCRIPTION OF THE INVENTION

The present invention is described more concretely.

The method of the present invention is for producing a catalyst of uniform, crystalline composite metal compound, based on the concept of support-metal-unified-synthesis (SMUS) that the inventors of the present invention have developed, which involves preparation of a homogeneous solution comprising the selected catalyst components (a), ($b_1$) and ($b_2$) dissolved in a non-aqueous solvent, and addition of a precipitant solution to the above homogeneous solution for simultaneous precipitation of the above catalyst components and accompanying coprecipitation.

More concretely, the SMUS process, the basic concept of which is described above, comprises the following steps I, II and III:

The step I is for preparation of a homogeneous solution by dissolving the catalyst components (a), ($b_1$) and ($b_2$) in a non-aqueous solvent.

The catalyst component (a) is (i) an aluminum compound soluble in a non-aqueous solvent, or (ii) a mixture of the above aluminum compound and at least one of the compounds selected from the group consisting of those of silicon, phosphorus and boron, soluble in the above solvent.

The catalyst component ($b_1$) is at least one of the compounds selected from the group consisting of those of the group 6A metals, and the catalyst component ($b_2$) is at least one of the compounds selected from the group consisting of those of the group 8 metals.

Procedure and timing of addition of each catalyst component are not limited. One procedure is to prepare a homogeneous solution of at least one of the catalyst components (a), ($b_1$) and ($b_2$), and to add the other components to the solution before a precipitant solution is added in the step II. They may be even added together with a precipitant solution in the step II.

The step II is for preparation of a gel slurry from the homogeneous solution by adding a precipitant solution to the homogeneous solution prepared in the step I. All of the catalyst components may be used to form the homogeneous solution in the step I, or the homogeneous solution of one or two components may be incorporated with the remaining component(s) together with the precipitant solution during the step II, where the former may be contained in the latter before they are added. The preferred embodiments for preparation of the gel slurry of the catalyst components (a), ($b_1$) and ($b_2$) in the steps I and II to realize the basic SMUS concept are described later.

The step III is for drying and calcinating the gel slurry prepared in the preceding step, after it is aged, as required. The gel slurry is normally aged under heating before it is dried.

The preferred embodiments for preparation of the gel slurry of the catalyst components (a), ($b_1$) and ($b_2$) in the steps I and II are described more concretely.

The first preferred embodiment (SMUS-A) prepares the homogeneous solution of the catalyst components (a), ($b_1$) and ($b_2$) dissolved in a non-aqueous solvent (the step I), and the gel slurry from the homogeneous solution by adding a precipitant solution to the above solution (step II). The preferred compounds include aluminum alkoxide, silicon alkoxide, and optionally phosphorus alkoxide and/or boron alkoxide for the catalyst component (a); a molybdate for the component ($b_1$); and inorganic salts of cobalt and nickel for the component ($b_2$), which are to be dissolved in a non-aqueous solvent to prepare the uniform solution. Ammonia water may be used as the precipitant solution.

The second preferred embodiment (SMUS-B) prepares the homogeneous solution of the catalyst component (a) dissolved in a non-aqueous solvent (the step I), and the gel slurry from the homogeneous solution by adding a precipitant solution containing the catalyst components ($b_1$) and ($b_2$) to the above solution (step II). The preferred compounds include aluminum alkoxide, silicon alkoxide, and optionally phosphorus alkoxide and/or boron alkoxide for the catalyst component (a); a molybdate for the component ($b_1$); and inorganic salts of cobalt and nickel for the component ($b_2$), which are to be dissolved in a non-aqueous solvent. An aqueous solution of urea may be used as the precipitant solution.

The third preferred embodiment (SMUS-C) prepares the homogeneous solution of the catalyst components (a) and ($b_2$) dissolved in a non-aqueous solvent (the step I), and the gel slurry from the homogeneous sol by adding a precipitant solution containing the catalyst component ($b_1$) to the above solution (step II). The preferred compounds include aluminum alkoxide, silicon alkoxide, and optionally phosphorus alkoxide and/or boron alkoxide for the catalyst component (a); a molybdate for the component ($b_1$); and inorganic salts of cobalt and nickel for the component ($b_2$), which are to be dissolved in a non-aqueous solvent. An aqueous solution of hydrogen sulfide may be used as the precipitant solution.

The fourth preferred embodiment (SMUS-D) prepares the homogeneous solution of the catalyst components (a) and ($b_1$) dissolved in a non-aqueous solvent (the step I), and the gel slurry from the homogeneous sol by adding a precipitant solution containing the catalyst component ($b_2$) to the above solution (step II). The preferred compounds include aluminum alkoxide, silicon alkoxide, and optionally phosphorus alkoxide and/or boron alkoxide for the catalyst component (a); a molybdate for the component ($b_1$); and inorganic salts of cobalt and nickel for the component ($b_2$), which are to be dissolved in a non-aqueous solvent. An aqueous solution of urea may be used as the precipitant solution.

As described above, there are a variety of embodiments for the present invention. The catalyst with a uniformly distributed hydrogenation-active component can be prepared by the above procedures.

The catalyst components used in the method for producing the hydrotreating catalyst are described more concretely.

The catalyst component (a) is (i) an aluminum compound soluble in a non-aqueous solvent, or (ii) a mixture of the above aluminum compound and at least one of the compounds selected from the group consisting of those of silicon, phosphorus and boron, soluble in the above solvent. The preferred compounds soluble in a non-aqueous solvent are oxygenated organometallic compounds, but inorganic compounds may be also used. The oxygenated organometallic compounds useful for the present invention include alkoxides, acetylacetonates and carboxylates of aluminum, silicon, phosphorus and boron, of which alkoxides with an alkoxyl group having a carbon number of 1 to 5 are preferable. The alkoxides of aluminum include aluminum methoxide [$Al(OCH_3)_3$], aluminum ethoxide [$Al(OC_2H_5)_3$], aluminum isopropoxide [$Al(i-OC_3H_7)_3$], and aluminum butoxide [$Al(OC_4H_9)_3$]. The alkoxides of silicon include tetramethoxy silane [$Si(OCH_3)_4$], tetraethoxy silane [$Si(OC_2H_5)_4$], tetraisopropoxy silane [$Si(i-OC_3H_7)_3$], and tetra-t-butoxy silane [$Si(t-OC_4H_9)_4$]. The alkoxides of phosphorus include phosphate ester and alkyl phosphoric acid, the former being more preferable (e.g., trimethyl and diisopropyl phosphate esters). The alkoxides of boron include boron methoxide [$B(OCH_3)_3$] and boron ethoxide [$B(OC_2H_5)_3$].

The other metal compounds useful for the catalyst component (a) include oxygenated organic compounds of magnesium, calcium, barium, zirconium, titanium, thorium, cerium, hafnium and gallium, which may be used together with the above-mentioned oxygenated organoaluminum compound and/or oxygenated organosilicon compound. These include magnesium methoxide [$Mg(OCH_3)_2$], magnesium ethoxide [$Mg(OC_2H_5)_2$], magnesium isopropoxide [$Mg(i-OC_3H_7)_2$], calcium methoxide [$Ca(OCH_3)_2$], barium methoxide [$Ba(OCH_3)$], zirconium ethoxide [$Zr(OC_2H_5)_4$], zirconium propoxide [$Zr(n-OC_3H_7)_4$], zirconium-sec-butoxide [$Zr(sec-OC_4H_9)_4$], titanium ethoxide [$Ti(OC_2H_5)_4$], titanium isopropoxide [$Ti(i-OC_3H_7)_4$] and hafnium ethoxide [$Hf(OC_2H_5)_4$]. Other alkoxides useful for the present invention include those of an alkali metal, e.g., sodium methoxide ($NaOCH_3$) and potassium methoxide ($KOCH_3$), and dimetallic alkoxides, e.g., $Mg(Al(i-OC_3H_7)_4)_2$ and $Ni(Al(i-OC_3H_7)_4)_2$.

The inorganic compounds useful for the present invention include metal salts which are soluble in a non-aqueous solvent, e.g., nitrates, sulfates, chlorides, acetates, hydroxides and phosphates, and compatible with the above oxygenated organo-metallic compound. These include aluminum nitrate, sulfate, chloride and hydroxide.

The SMUS method can use any of the above-mentioned metal alkoxides. These alkoxides may be used either individually or in combination of two or more, depending on specific purposes of the catalyst. In particular, aluminum alkoxide or a combination of aluminum and silicon alkoxides can be used, for the compositional components and properties of the hydrotreating catalyst for hydrocarbon oils. More concretely, the alkoxide(s) useful for the resent invention include (1) aluminum alkoxide, and (2) aluminum alkoxide/silicon alkoxide, which may be further incorporated with an alkoxide of, e.g., phosphorus, boron or zirconium. Quantities of alkoxides of aluminum, silicon, phosphorous, titanium, boron, zirconium and the like may be optionally set, depending on specific purposes of the catalyst. For the catalyst for deep hydrodesulfurization of a hydrocarbon oil, aluminum alkoxide may be mixed with silicon alkoxide in such a way to give silica-containing alumina present at 5 to 40 wt. % as the oxides, based on the whole catalyst.

The metal compounds useful for the catalyst component ($b_1$) should exhibit hydrogenation activity, and include metal oxides, and salts and complexes convertible into metal sulfides, nitrides, carbides and the like. The catalyst component ($b_1$) is at least one of the compounds selected from the group consisting of those of the group 6A metals. More concretely, they include salts of metals such as chromium, molybdenum and tungsten; e.g., inorganic salts (e.g., nitrates, chlorides, oxychlorides and ammonium salts of metallic acids); and organic acid salts (e.g., acetates and oxalates). The ammonium salts of metallic acids include ammonium molybdate, tungstate, para-molybdate, phosphomolybdate and phosphotungstate. The organometallic compounds, e.g., alkoxides, acetylacetonates and carboxylates, can be also used.

The metal compounds useful for the catalyst component ($b_2$) should also exhibit hydrogenation activity, and include elements, metal oxides, and salts and complexes convertible into metal sulfides, nitrides, carbides and the like. The catalyst component ($b_2$) is at least one of the compounds selected from the group consisting of those of the group 8 metals. More concretely, they include salts of metals such as iron, cobalt, nickel, ruthenium, rhodium, palladium, indium, osmium, iridium, platinum; e.g., inorganic salts (e.g., nitrates, chlorides, oxychlorides and ammonium salts of metallic acids); and organic acid salts (e.g., acetates and oxalates). The organometallic compounds, e.g., alkoxides, acetylacetonates and carboxylates, can be also used.

A combination of compounds of the metals of group 6A and group 8 is suitable for the catalyst for hydrotreating a hydrocarbon oil. For production of such a catalyst, at least one of the compounds selected from the group consisting of those of the group 6A metals (e.g., molybdenum, tungsten and chromium) and at least one of the compounds selected from the group consisting of those of the group 8 metals (e.g., cobalt, nickel, ruthenium, rhodium, palladium, osmium, iridium, platinum) can be used. The preferable combinations include molybdenum-cobalt, molybdenum-nickel, tungsten-nickel, molybdenum-cobalt-nickel and tungsten-cobalt-nickel, for which phosphomolybdate, nickel nitrate, and cobalt nitrate are used.

The other hydrogenation-active compounds useful for the present invention include those of copper (group 1B), zinc and cadmium (group 2B), tin (group 4B), phosphorus (group 5B) and manganese and rhenium (group 7B), which may be used in place of, or together with, the compound of the group 6A or 8 metal.

Quantities of the catalyst components ($b_1$) and ($b_2$) are controlled in the steps I and II, to be included in the catalyst at 0.02 moles to 0.4 moles per mole of the total elements that constitute the hydrotreating catalyst. Including specific contents of the metals gives the uniform, crystalline catalyst.

The non-aqueous solvent to be used in the step I is not limited, so long as it dissolves the catalyst components (a), ($b_1$) and ($b_2$) to form a homogeneous solution. The compounds useful for the present invention as the solvent include monoalcohols, divalent alcohols, ketoalcohols, aminoalcohols and carboxylic acids, of which divalent alcohols are more preferable. The divalent alcohols useful for the present invention include hexylene glycol, 3-methyl-1,3-butanediol, 2,5-dimethyl-2,5-hexanediol, 2,3-butanediol, 2,4-pentanediol, 1,5-pentanediol, 1,6-hexanediol, 2,5-hexanediol, 1,2-cyclo-hexanediol and 1,3-cyclohexanediol.

The non-aqueous solvent can be used at 0.1 moles to 50 moles per mole of a metal compound as the catalyst component (a), preferably 1 mol/mol to 20 mol/mol. At above 50 mol/mol, an excessive quantity of the solvent will make it difficult to form a homogeneous gel slurry in the subsequent step. At below 0.1 mol/mol, on the other hand, the gel may not be sufficiently fluid, making it difficult to form the highly homogeneous catalyst.

In the step I for the present invention, the oxygenated organometallic compound as the catalyst component (a) and inorganic metallic compounds as the catalyst components ($b_1$) and ($b_2$) are dissolved in the non-aqueous solvent, with stirring by an adequate means, to form the homogeneous solution. Temperature at which the homogeneous solution is formed is not limited, and can be set optionally depending on, e.g., type of solvent used. However, it is preferably in a range from 10° C. to 100° C., for controlling deterioration of the reaction reagent and reducing preparation time.

The precipitant solution to be used in the step II for simultaneous precipitation of the catalyst components and accompanying coprecipitation is composed of a precipitant dissolved in water. The precipitants solution useful for the present invention includes aqueous solutions of ammonia, amine, hydrogen sulfide, ammonium sulfide, ammonium thiocyanate, oxalic acid, phosphoric acid, urea and thiourea. They may be used either individually or in combination. One or more aqueous solutions are selected for specific catalyst components and procedure by which they are added. Preferable aqueous precipitant solutions include those of ammonia, hydrogen sulfide, ammonium sulfide, thiourea and a mixture thereof, for securing high desulfurization activity.

The simultaneous precipitation of the catalyst components from the homogeneous solution is effected by the aid of the precipitant solution, which forms compounds of low solubility product constant (Ksp) with the organic solvent and, at the same time, to coprecipitate the coexisting, low-concentration ions having a solubility product constant lower than the above. It is important to select the simultaneous precipitation conditions viewed from preparation of the fluid gel slurry from the homogeneous solution. More concretely, it is possible to control rate of simultaneous precipitation of each of the catalyst components (a), ($b_1$) and ($b_2$) by setting its solubility product constant at $10^{-2}$ or less.

Solubility product with a solvent can be determined by one of the following methods:
1) the closed method in which solubility product is measured for a closed saturated system of a solute and solvent: it is further subdivided into the dew point method and the one using a differential thermal analyzer (or a conductivity analyzer for electrolytes) which establishes a cooling curve by cooling the system from temperature at which the solute is completely dissolved and absorbing or releasing the heat of crystallization when it crystallizes, and 2) the chemical analysis of a saturated solution attaining a solubility equilibrium at given temperature, after it is selectively taken out: this analysis is conducted by a Bordeaux, Campbell or Robinson solubility analyzer.

When an aqueous solution of hydrogen sulfide is used as the precipitant solution for the step II, the precipitate containing all of the catalyst components can be prepared, because the oxygenated organometalllic compound or oxygenated organophosphorus compound as the catalyst component (a) is hydrolyzed to be simultaneously precipitated as the hydroxide, and the inorganic metal compounds as the catalyst components ($b_1$) and ($b_2$) are simultaneously precipitated as the sulfides or coprecipitated by adsorption, occlusion, solid solution formation or the like.

In order to form the homogeneous solution in the step II, one should control the quantity of the precipitant solution at a level sufficient for precipitation of the target components. One should also prepare the fluid gel slurry from the homogeneous solution, for which the conditions (e.g., stirring rate, gel particle size, gel particle concentration, temperature and pressure) are preferably set.

In the step III, the prepared gel slurry is normally aged, for which it is heated to 50° C. to 99° C. at which it is held preferably for at least 1 hour. This treatment is mainly aimed at controlling pore characteristics of the catalyst and improving its activity.

The aged gel slurry as the catalyst precursor is treated by filtration, settling, centrifugal separation or evaporation to adjust content of the water-containing solvent, and formed into a shape by tablet making, extrusion, rotary granulation or the like. The catalyst may be cylindrical, tablet-shaped, spherical or others, such as that having a four-leaf section. It is important for the catalyst to have a shape and size which allow to control packing density in the reactor. Catalyst diameter is normally in a range from 0.5 mm to 20 mm on the average, viewed from increasing packing density and controlling pressure loss.

The catalyst pellets formed are then dried and calcined. They may be dried by one of many methods, e.g., air-drying, drying in hot wind, drying under heating and freeze drying. They are calcined at 150° C. to 700° C. at which they are held for 1 hour to 20 hours in an oxidative, reducing, inert, sulfiding, nitriding, carbonizing or steam atmospheres depending on their specific purposes.

The sulfiding treatment is effected by bringing the calcined catalyst pellets into contact with a sulfur compound or sulfur-containing hydrocarbon oil. Normally, the catalyst is pre-sulfided in the reactor under the conditions of temperature: 150° C. to 500° C., pressure (total pressure): 1 kg/cm² to 350 kg/cm², liquid hourly space velocity: 0.01 $hr^{-1}$ to 20 $hr^{-1}$, and treat gas rate: 30l/1 to 2000 1/1.

The active metal component is nitrided with ammonia, or carbonized with carbon.

The above activation treatment improves reaction activity, e.g., that for desulfurization, and mechanical strength, among others.

The hydrotreating catalyst produced by the method of the present invention contains a uniform, crystalline composite metal compound composed of a mixture of at least one of element, oxide, sulfide, nitride and carbide. The content of the composite metal compound is 0.02 moles to 0.4 moles as the hydrogenation-active metal elements per mole of the total elements that constitute the hydrotreating catalyst. The catalyst has a specific surface area of 10 m²/g to 1000 m²/g, total pore volume of 0.1 ml/g to 2 ml/g and average pore diameter of 4 to 1000, and is suitable for hydrotreating a hydrocarbon oil.

Hydrocarbon oils which can be treated by the catalyst produced by the method of the present invention are not limited. They include petroleum-derived oils, e.g., atmospheric distillates, atmospheric residue, vacuum distillates, vacuum residue, cracked distillates, raffinates, hydrotreated oils, deasphalted oils, dewaxed oil, slack wax, Fischer-Tropsch wax, and a mixture thereof. They also include oil derived from tar sand and shale oil, coal-liquefied oil, and a mixture thereof. The catalyst is particularly suitable for treating vacuum, cracked and straight-run distillates to remove their sulfur- and nitrogen-containing compounds which are difficult to remove.

A vacuum distillate, produced by treating atmospheric residue under a vacuum, boils at around 370° C. to 610° C., and contains significant quantities of sulfur, nitrogen and metals, e.g., at 2 wt. % and 800 wt. ppm for sulfur and nitrogen. The sulfur-containing compounds include 4-methyldibenzothiophene and 4,6-dimethyl-dibenzothiophene. The nitrogen-containing compounds include pyridines, amines and amides which are basic, and pyrroles which are weakly basic. The metals include nickel, vanadium and iron. The catalyst produced by the method of the present invention can treat these vacuum distillates most efficiently to remove sulfur and nitrogen.

Cracked distillates are the fractions boiling at around 200° C. or higher, produced by thermal cracking (e.g., coking or visbreaking) of residue, or light cycle gas oil (LCGO) or heavy cycle gas oil (HCGO) produced by a fluid catalytic cracking unit.

The atmospheric distillates include straight-run naphtha, straight-run heavy naphtha and kerosene fractions. They also include gasoline components produced by various cracking units, e.g., catalytically cracked naphtha, thermally cracked naphtha and steam-cracked naphtha, and other light fractions used as fuel components which boil at around 250° C. or lower.

The hydrotreating conditions are not limited. They can be adequately selected for specific situations, e.g., type of hydrocarbon oil to be treated and desired reactions, and target desulfurization and denitrogenation levels. The conditions are reaction temperature: 150° C. to 500° C., preferably 200° C. to 450° C.; reaction pressure: 1 kg/cm$^2$ to 350 kg/cm$^2$, more preferably 5 kg/cm$^2$ to 300 kg/cm$^2$, hydrogen-containing treat gas rate: 301/1 to 20001/1, and liquid hourly space velocity: 0.01 V/H/V to 20.0 V/H/V, preferably 0.05 V/H/V to 10.0 V/H/V. For example, a preferred set of conditions includes 370° C. as reaction temperature, 60 kg/cm$^2$ as reaction pressure, 214 1/1 as hydrogen-containing treat gas rate, and 1.0 V/H/V as liquid hourly space velocity. Hydrogen content in treat gas can be 60% to 100%. The hydrotreating catalyst produced by the method of the present invention exhibits high activities for, e.g., hydrofining, hydrodesulfurization, hydro-denitrogenation, hydrodearomatization, hydroisomerization, hydrocracking and hydrodewaxing, and also high activity maintenance therefor. Therefore, it can stably achieve required performance, e.g., desulfurization rate, for extended periods under the severe conditions which would deactivate the conventional catalyst in a short time, in particular under low reaction pressure.

Hydrotreatment of a hydrocarbon oil over the catalyst produced by the present invention can be effected in any type of reactor, e.g., fixed, fluidized, ebullated or moving bed type. A fixed bed type is a normal choice, for its simpler process and higher operability. Two or more reactors may be connected in series for deeper hydrotreatment. This is a particularly preferable configuration, when heavy oil is to be treated. Hydrocarbon oil may be brought into contact with a hydrogen-containing treat gas either co-currently or counter-currently.

EXAMPLES

The present invention is described more concretely by EXAMPLES, which by no means limit the present invention.

The following reaction reagents or the like are used for catalysts prepared by EXAMPLES and COMPARATIVE EXAMPLES:

| | |
|---|---|
| Aluminum isopropoxide | Al(i-OC$_3$H$_7$)$_3$ |
| Tetraethoxysilane | Si(OC$_2$H$_5$)$_4$ |
| 12-Molybdo-1-phosphoric acid | H3(PM$_{12}$O$_{40}$.6H$_2$O) |
| Ammonium 7-molybdate | (NH$_4$)$_6$Mo$_7$O$_{24}$.4H$_2$O |
| Cobalt nitrate | Co(NO$_3$)$_2$.6H$_2$O |
| Nickel nitrate | Ni(NO$_3$)$_2$.6H$_2$O |

Homogeneity and crystallinity of the catalyst were analyzed by the EPMA line and plane analysis, and powder X-ray diffractometry, respectively.

Example 1 (SNCMSAM02)

A homogeneous solution of 46.0 g of aluminum isopropoxide, 4.9 g of tetraethoxysilane, 9.0 g of cobalt nitrate, 2.1 g of nickel nitrate and 370.8 g of hexylene glycol was prepared with stirring at 80° C. for 4 hours.

Then, 9.5 g of ammonium 7-molybdate was dissolved in 208.9 g of pure water, to which ammonia water was added to keep the solution at pH 9.8. A hydrogen gas containing 5% of H$_2$S was passed through this solution with stirring at 400 ml/min for 8 hours, and then an N$_2$ gas was passed through this solution with stirring at 20 ml/min for 12 hours, to form an aqueous solution of precipitant of pH 9.1.

The aqueous solution of precipitant was added to the above homogeneous solution dropwise at 10 ml/min for hydrolysis, to prepare a slurry containing the precipitate. The gel slurry thus prepared was aged under heating at 90° C. for 16 hours. The aged gel slurry was centrifugally treated to separate the gel from the solvent. The gel was dried at 90° C. for 24 hours under a vacuum, to prepare the catalyst precursor. This precursor was immersed in a hydrocarbon liquid, and then thermally cracked at 370° C. in a flow of hydrogen, to prepare a hydrotreating catalyst (SNCMSAM02). It had a chemical composition of silica: 5.7 wt. %, alumina: 45.9 wt. %, molybdenum sulfide: 34.5 wt. %, cobalt sulfide: 11.3 wt. % and nickel sulfide: 2.6 wt. %, and contained 0.122 mol/mol of the hydrogenation-active component. It showed homogeneity and crystallinity.

Example 2 (NCMSAH16)

A mixture of 78.9 g of aluminum isopropoxide and 493.7 g of hexylene glycol was stirred at 80° C. for 4 hours, to which 8.4 g of tetraethoxysilane was added, and the mixture was further stirred at 80° C. for 3 hours. Then, 5.8 g of cobalt nitrate and 1.4 g of nickel nitrate were added to the above, and the mixture was stirred at 80° C. for 17 hours into a homogeneous solution.

Then, 7.4 g of ammonium 7-molybdate was dissolved in 119 ml of pure water at 80° C., to which ammonia water was added to prepare water for hydrolysis kept at pH 9. It was added to the above homogeneous solution dropwise at 1 ml/min for hydrolysis, to prepare a slurry containing the precipitate. The gel slurry thus prepared was aged under heating at 90° C. for 88 hours. The aged gel slurry was evaporated and solidified by a rotary evaporator, and then calcined at 650° C. in a flow of air, to prepare a hydrotreating catalyst (NCMSAH16).

It had a chemical composition of silica: 8.1 wt. %, alumina: 65.7 wt. %, molybdenum oxide: 20.0 wt. %, cobalt oxide: 5.0 wt. % and nickel oxide: 1.2 wt. %, and contained 0.051 mol/mol of the hydrogenation-active component. It showed homogeneity and crystallinity.

Example 3 (NCMSAH13)

A mixture of 64.9 g of aluminum isopropoxide and 451.1 g of hexylene glycol was stirred at 80° C. for 4 hours, until the homogeneous solution was obtained, to which 6.9 g of tetraethoxysilane was added, and the mixture was further stirred at 80° C. for 3 hours. Then, 8.7 g of cobalt nitrate and 2.1 g of nickel nitrate were added to the above, and the mixture was stirred at 80° C. for 4 hours into a homogeneous solution.

Then, 11.0 g of ammonium 7-molybdate was dissolved in 97.8 g of pure water, to which ammonia water was added to prepare an aqueous solution of precipitant kept at pH 9.

The aqueous solution of precipitant was added to the above homogeneous solution dropwise at 1 ml/min for hydrolysis, to prepare a slurry containing the precipitate. The gel slurry thus prepared was aged under heating at 90° C. for 88 hours. The aged gel slurry was evaporated and solidified by a rotary evaporator, and calcined at 650° C. for 5 hours in a flow of air, to prepare a hydrotreating catalyst (NCMSAH13). It had a chemical composition of silica: 6.7 wt. %, alumina: 54.0 wt. %, molybdenum oxide: 30.0 wt. %, cobalt oxide: 7.5 wt. % and nickel oxide: 1.8 wt. %, and contained 0.082 mol/mol of the hydrogenation-active component. It showed homogeneity and crystallinity.

Comparative Example 1

Pure water (2.0 l) was heated to about 70° C., to which caustic soda was added to keep the solution at around pH 12. An aqueous solution of aluminum sulfate (aluminum sulfate: 518 g and pure water: 710 g) was added to the above alkaline water. The solution was adjusted at pH 8.4 to 8.8 with caustic soda or nitric acid, and aged at around 70° C. for around 0.5 hours, to form an aqueous solution containing the precipitate (gel) of aluminum hydrate. An aqueous solution of sodium silicate (No.3 water glass, pure water: 210 g) was added to the above aqueous solution. The mixed solution was adjusted at pH 8.8 to 9.2 with nitric acid, and aged at around 70° C. for around 0.5 hours, to form a slurry solution containing precipitated particles of alumina hydrate covered with silica hydrate. This slurry was filtrated, and the separated cake was washed with an aqueous solution of ammonium carbonate, until sodium content in the filtrate was decreased to 5 ppm or less. The cake was dried at 80° C. in a kneader to a moisture content at which it was moldable, and extruded into cylindrical pellets, 1.5 mm in diameter. The pellets were dried at 120° C. for 16 hours and calcined at 700° C. for 3 hours, to prepare the carrier.

The carrier was impregnated with an aqueous solution of ammonium 7-molybdate, and dried at 120° C. and calcined at 450° C. It was then impregnated with an aqueous solution of cobalt nitrate and nickel nitrate, and dried at 120° C. and calcined at 500° C., to prepare the comparative catalyst (a). It contained 0.051 mol/mol of the hydrogenation-active component.

Comparative Example 2

A mixture of 178.3 g of aluminum isopropoxide and 765 ml of hexylene glycol was stirred to react them with each other at 80° C. for 4 hours, to which 13.9 g of tetraethoxysilane was added with stirring at 80° C. for 20 hours, for further reactions. Water (196 ml) was added to the above reaction system at 1 ml/min, for hydrolysis at 80° C.

The effluent solution was aged at 90° C. for 72 hours, evaporated and solidified by a rotary evaporator, and calcined at 650° C. for 5 hours in a flow of air. The green compact thus prepared was molded by a tablet maker, 20 mm in diameter, at 2 tons/cm$^2$, into a carrier of 11% $SiO_2$-$Al_2O_3$.

The carrier was impregnated with active metals by the following procedure: The impregnation solution was prepared by dissolving 11.2 g of 12-molybdo-1-phosphoric acid, 9.7 g of cobalt nitrate, 2.3 g of nickel nitrate and 5.8 g of citric acid in 44 g of a mixed solution of ammonia water and pure water, where ammonia water/pure water ratio was adjusted to make the solution with the solutes completely dissolved at pH 9.

The impregnation solution was added dropwise onto the carrier. The impregnated carrier was dried at 110° C. all night, and calcined at 500° C. for 3 hours in a flow of air, to prepare the comparative catalyst (b).

The comparative catalyst (b) thus prepared had a composition of silica: 8.0 wt. %, alumina: 65.0 wt. %, molybdenum oxide: 20.0 wt. %, cobalt oxide: 5.0 wt. %, nickel oxide: 1.2 wt. % and phosphorus oxide: 0.8 wt. %, and contained 0.051 mol/mol of the hydrogenation-active component. It had a specific surface area: 244 m$^2$/g and total pore volume: 0.43 ml/g.

Comparative Example 3

A mixture of 0.62 g of aluminum isopropoxide [Al(i-OC$_3$H$_7$)$_3$] and 777.0 g of hexylene glycol was stirred at 80° C. for 4 hours, to which 148.5 g of tetraethoxysilane was added, and the mixture was further stirred at 80° C. for 3 hours.

Then, 5.8 g of 12-molybdo-1-phosphoric acid [H$_3$(PM$_{12}$O$_{40}$.6H$_2$O)], 5.1 g of cobalt nitrate [Co(NO$_3$)$_2$.6H$_2$O] and 1.2 g of nickel nitrate [Ni(NO$_3$)$_2$.6H$_2$O] were added to the above solution, with stirring at 80° C. for 17 hours, to prepare a homogeneous solution.

Water (257 ml) was added dropwise at 80° C. to the above homogeneous solution at 1 ml/min for hydrolysis, to prepare a slurry containing the precipitate. Then, the slurry was allowed to stand for 160 hours, while kept at 90° C., for aging, evaporated and solidified by a rotary evaporator, and calcined at 650° C. for 5 hours in a flow of air. The catalyst thus prepared, comparative catalyst (c), had a chemical composition of alumina: 0.3 wt. %, silica: 85.7 wt. %, molybdenum oxide: 10.4 wt. %, cobalt oxide: 2.6 wt. %, nickel oxide: 0.6 wt. % and phosphorus oxide: 0.4 wt. %, and contained 0.025 mol/mol of the hydrogenation-active component.

The chemical compositions and properties of the catalysts prepared by EXAMPLES and COMPARATIVE EXAMPLES are given in Table 1.

Evaluation of Catalyst Activity

The catalysts prepared by EXAMPLES and COMPARATIVE EXAMPLES were evaluated for their activity by hydrotreating a hydrocarbon oil under the following conditions:

(1) Preparation of Catalyst Pellets

The catalyst pellets were prepared for evaluation of catalyst activity by the following procedure. The catalyst composition was compacted at 2 tons/cm² by a tablet maker, 20 mm in diameter. The compact was crushed in an alumina mortar, and screened by a 500 μm sieve. The pellets not passing through the sieve were used for catalyst activity evaluation.

For the catalyst composition prepared by COMPARATIVE EXAMPLES 1 and 2 were directly crushed in an alumina mortar. The pellets were screened by a 500 μm sieve, and those passing through the sieve were further screened by a 250 μm sieve. The pellets not passing through the sieve were used for catalyst activity evaluation.

Evaluation of Hydrodesulfurization (HDS) Activity with Light Gas Oil (LGO-D) from a Middle Eastern Crude Test oil properties, reactor system and reaction conditions are given in Table 3.

The test was conducted by the following procedure:

(i) For the Case of Catalyst, Other than that Prepared by Example 1 (SNCMSAM02)

The catalyst (4.6 g) packed in a reactor was treated with a hydrogen gas containing 5% of $H_2S$ flown at 200 cc/min, for sulfiding under the following temperature program:

The catalyst was heated from room temperature to 200° C. in 30 min, at which it was held for 30 min, to 340° C. in 30 min, at which it was held for 2 hours, and then cooled to 200° C. in 30 min.

LGO-D (approximately 25 cc) was passed into the reactor when the sulfided catalyst was cooled to 170° C. On completion of passing LGO-D, reactor pressure was increased, and then temperature was also increased to 320° C. in 30 min, for the hydrodesulfurization (HDS) reactions.

(ii) For the Case of Catalyst prepared by Example 1 (SNCMSAM02)

The reactor containing 12.7 g of the catalyst precursor and 18 g of tridecane was pressurized by a hydrogen gas to 9 kg/cm²-G. The catalyst was heated from room temperature at 10° C./min to 350° C. at which it was held for 40 min, while a hydrogen gas and tridecane were passed through the reactor at 100 ml/min and 0.36 ml/min, respectively. It was then cooled to 340° C., and pressure in the reactor was decreased to 0 kg/cm²-G. It was kept at the above temperature level for 2 hours, while a hydrogen gas containing 5% of $H_2S$ was passed through the reactor at 200 ml/min.

The reactor was cooled further to 170° C., and approximately 25 cc of LGO-D was passed therethrough. It was then pressurized with hydrogen to a given reactor pressure, and heated to 320° C. in 30 min, for the hydrodesulfurization (HDS) reactions.

Catalyst HDS activity was determined by measuring sulfur content of the product obtained 10 hours after LGO-D was charged.

HDS activity was determined by the following formula:

HDS activity=(Liquid Hourly Space Velocity per Unit Catalyst Weight)×[1/$S^{0.5}$−1/$S_0^{0.5}$]

wherein, S and $S_0$ are sulfur contents of the product and feed.

(3) Evaluation of Hydrodesulfurization (HDS), Hydrodenitrogenation (HDN), Hydrodearomatization (HDA), Hydroisomerization (HI), and Hydrocracking (HC) Activities with a Model Feed.

The evaluation test conditions are given in Table 4, and evaluation results in Tables 5 and 6.

The evaluation test was conducted using a 50 ml flow type autoclave by the following procedure:

(i) For the Case of the Catalyst Other than that Prepared by Example 1 (SNCMSAM02)

The catalyst (0.5 g) put in the autoclave reactor was treated with a hydrogen gas containing 5% of $H_2S$ flown at 200 ml/min, for sulfiding under the following temperature program:

The catalyst was heated from room temperature to 200° C. in 30 min, at which it was held for 30 min, to 340° C. in 30 min, at which it was held for 2 hours, and then cooled to 200° C. in 30 min.

A test oil for each test was passed into the reactor when the sulfided catalyst was cooled to 200° C. On completion of passing the test oil, reactor pressure was increased to 9 kg/cm²-G, and then temperature was also increased to 310° C. in 30 min, for the hydrotreating reactions under the conditions given in Table 4.

(ii) For the Case of the Catalyst Prepared by Example 1 (SNCMSAM02)

The reactor containing 0.77 g of the catalyst precursor and 7 g of tridecane was pressurized by hydrogen gas to 9 kg/cm²-G. The catalyst was heated from room temperature at 20° C./min to 370° C. at which it was held for 40 min, while hydrogen gas and tridecane were passed through the reactor at 100 ml/min and 0.5 ml/min, respectively. It was then cooled to 330° C., and pressure in the reactor was decreased to 0 kg/cm²-G. It was kept at the above temperature level for 1 hour, while a hydrogen gas containing 5% of $H_2S$ was passed through the reactor at 100 ml/mm.

The reactor was cooled further to 310° C., and pressurized again with hydrogen to 9 kg/cm²-G, for the hydrotreating reactions under the conditions given in Table 4.

Hydrodesulfurization(HDS), hydrodenitrogenation (HDN), hydrodearomatization (HDA), hydroisomerization (HI), and hydrocracking (HC) activities were determined by the following formulae:

HDS activity (DBT)=(Liquid Hourly Space Velocity per Unit Catalyst Weight)×[($N_{DBT,0}$−$N_{DBT}$)/($N_{DBT,0}$)]

wherein, $N_{DBT}$ and $N_{DBT,0}$ are dibenzothiophene contents of the product and feed.

HDS activity (4,6DMDBT)=(Liquid Hourly Space Velocity per Unit Catalyst Weight)×[($N_{4,6DMDBT,0}$−$N_{4,6DMDBT}$)/($N_{4,6DMDBT,0}$)]

wherein, $N_{4,6DMDBT}$ and $N_{4,6DMDBT,0}$ are 4,6 dimethyldibenzothiophene contents of the product and feed.

HDN activity=(Liquid Hourly Space Velocity per Unit Catalyst Weight)×($N_N$)/($N_{N,0}$−$N_N$)

wherein, $N_{N,0}$ is quinoline content of the feed and $N_N$ is a total content of propylcyclohexene, propylcyclohexane and propylbenzene in the product.

HDA activity=(Liquid Hourly Space Velocity per Unit Catalyst Weight)×($N_A$)/($N_{A,0}$−$N_A$)

wherein, $N_{A,0}$ is 1-methylnaphthalene content of the feed and $N_A$ is a total content of 2-methylnaphthalene, methyl tetralin, methyl decalin, alkyl benzene and alkyl toluene in the product.

HI activity=(Total area of peaks at a retention time of 9.40 to 10.14 in the gas chromatogram obtained under the conditions given in Table 4, % on total area of all peaks)

HC activity=(Total area of peaks at a retention time of 4.8 to 5.18 in the gas chromatogram obtained under the conditions given in Table 4, % on total area of all peaks)

TABLE 1

| | EXAMPLES | | | COMPARATIVE EXAMPLES | | |
|---|---|---|---|---|---|---|
| | 1 | 2 | 3 | 1 | 2 | 3 |
| SMUS Catalyst | SNCM SAM02 | NCM SAM16 | NCM SAM13 | a | b | c |
| Production method | SMUS-C | SMUS-C | SMUS-C | Impregnation | Impregnation | Sol-gel |
| Precipitant Soln. | H₂S/Ammonia water | Ammonia water | Ammonia water | — | — | Water |
| Chemical Composition (wt. %) | | | | | | |
| MoO₃ | 34.5*¹ | 20.0 | 30.0 | 20.0 | 20.0 | 10.4 |
| CoO | 11.3*² | 5.0 | 7.5 | 5.0 | 5.0 | 2.6 |
| NiO | 2.6*³ | 1.2 | 1.8 | 1.2 | 1.2 | 0.6 |
| Al₂O₃ | 45.9 | 65.7 | 54.0 | 65.0 | 65.0 | 0.3 |
| SiO₂ | 5.7 | 8.1 | 6.7 | 8.8 | 8.0 | 85.7 |
| P₂O₅ | — | — | 1.3 | — | 0.8 | 0.4 |
| Hydrotreating-active component (mol/mol) | 0.122 | 0.051 | 0.082 | 0.051 | 0.047 | 0.025 |
| Specific surface area (m²/g) | 210 | 398 | 320 | 254 | 244 | — |
| Total pore volume (ml/g) | 0.77 | 1.36 | 1.15 | 0.42 | 0.43 | — |
| Homogeneity (EPMA) | Yes | Yes | Yes | No | No | Yes |
| Crystallinity (Diffraction Line) | Yes | Yes | Yes | Yes | Yes | No |

Note
*¹MoS₂
*²CoS
*³NiS

TABLE 2

| Test oil | LGO-D |
|---|---|
| Specific gravity (15/4° C.) | 0.846 |
| Sulfur (wt. %) | 0.92 |
| Nitrogen (wt. ppm) | 91.0 |
| Aromatics (wt. %) | 26.8 |
| Reactor: | |
| Fixed-bed, flow type reactor | |
| Reactor inner diameter: 10 mm | |
| Reactor conditions: | |
| Reactor temperature (° C.) | 320 |
| Reactor pressure (kg/cm²-G) | 9 |
| Liquid hourly space velocity (hr⁻¹) | 0.5 |
| Hydrogen/oil ratio (SCF/B) | 800 |

TABLE 3

| | Test Conditions | | |
|---|---|---|---|
| | 1 | 2 | 3 |
| Test Oil Composition (wt. %) | | | |
| n-C₁₆ | 99.20 | 99.13 | 89.20 |
| DBT | 0.50 | 0.50 | 0.50 |
| 4,6-DMDBT | 0.30 | 0.30 | 0.30 |
| Quinoline | — | 0.07 | — |
| 1-Methyl naphthalene | — | — | 10.00 |
| Reactor temperature (° C.) | 310 | 310 | 310 |
| Liquid hourly space velocity (hr⁻¹) per unit catalyst weight | 1.0 | 1.0 | 1.0 |
| Hydrogen/oil ratio (SCF/B) | 2000 | 2000 | 2000 |

TABLE 4

| Gas chromatograph: | GL Science, GC-353 (FID) |
|---|---|
| Column: | J&W Scientific, DB-1 |
| | Inner diameter: 0.25 mm |
| | Film thickness: 1 μm |
| | Length: 60 m |

TABLE 4-continued

| Analysis conditions: | Oven temperature: 250° C. |
|---|---|
| | Injection temperature: 250° C. |
| | Detector temperature: 250° C. |

TABLE 5

| | EXAMPLES | | | COMPARATIVE EXAMPLES | | |
|---|---|---|---|---|---|---|
| | 1 | 2 | 3 | 1 | 2 | 3 |
| | SMUS Catalysts | | | Comparative catalysts | | |
| | SNCM SAM02 | NCM SAH16 | NCM SAH13 | a | b | c |
| Hydrodesulfurization activity (HDS) | | | | | | |
| HDS (LGO-D) | 3.2 | 3.1 | 2.7 | 2.3 | 2.2 | — |
| HDS (4.6-DMDBT) | 21.8 | 14.6 | 15.0 | 11.42 | 11.0 | 5.7 |
| HDS (DBT) | 97.1 | 83.0 | 65.0 | 47.76 | 45.0 | 36.6 |
| Hydrodenitrogenation activity HDN | — | — | — | 5.75 | 5.0 | — |
| Hydrodearomatization activity HDA | 5.5 | 4.5 | 3.6 | 4.15 | 4.0 | 4.0 |
| Hydrocracking activity HC | 0.023 | 0.05 | 0.03 | 0.04 | 0.03 | 0.2 |
| Hydroisomerization activity HI | 0.16 | 0.2 | 0.82 | 1.17 | 1.0 | — |

Comparing the catalysts prepared by EXAMPLES with those prepared by COMPARATIVE EXAMPLES, the one prepared by EXAMPLE 1, a concrete example which uses a precipitant solution obtained by adding a molybdenum compound to an aqueous solution of hydrogen sulfide and ammonia, has homogeneity and crystallinity, showing much higher activities for various hydrogenation-related reactions than any of those prepared by COMPARATIVE EXAMPLES.

The method of the present invention gives a hydrotreating catalyst in high yield, because the catalyst components (a), ($b_1$) and ($b_2$) of different precipitation characteristics can be simultaneously precipitated, the catalyst containing a composite metal compound of homogeneity and crystallinity. The catalyst produced by the method of the present invention has a large specific surface area and pore volume, in spite of high content of the active metals, and shows notable desulfurization, denitrogenation, dearomatization and isomerization activities in hydrotreatment of hydrocarbon oils. It is particularly suitable for highly hydrodesulfurization of a gas oil fraction containing sulfur compounds difficult to remove.

What is claimed is:

1. A method for producing a hydrotreating catalyst, which comprises:
   (1) dissolving catalyst components (a), ($b_1$) and ($b_2$), wherein said catalyst components are defined as:
      (a) (i) an aluminum compound soluble in a non-aqueous solvent, or
         (ii) a mixture of the above aluminum compound and at least one of the compounds selected from silicon, phosphorus and boron, soluble in the above solvent,
      ($b_1$) at least one of the compounds selected from group 6A metals, and
      ($b_2$) at least one of the compounds selected from group 8 metals in a non-aqueous solvent to form a homogeneous solution,
   (2) preparing a gel slurry from the homogeneous solution by adding a precipitant solution to the homogeneous solution wherein said precipitant solution is an aqueous solution of ammonia, amine, hydrogen sulfide, ammonium sulfide, ammonium thiocyanate, urea, thiourea, or a mixture thereof, and
   (3) drying and calcining the gel slurry to form a homogeneous, crystalline composite metal compound.

2. A method for producing a hydrotreating catalyst, which comprises:
   (1) dissolving at least one of catalyst components (a), ($b_1$) and ($b_2$), wherein said catalyst components are defined as:
      (a) (i) an aluminum compound soluble in a non-aqueous solvent, or
         (ii) a mixture of the above aluminum compound and at least one of the compounds selected from silicon, phosphorus and boron, soluble in the above solvent,
      ($b_1$) at least one of the compounds selected from group 6A metals, and
      ($b_2$) at least one of the compounds selected from group 8 metals in a non-aqueous solvent to form a homogeneous solution,
   (2) preparing a gel slurry from the homogeneous solution by adding a precipitant solution wherein said precipitant solution is an aqueous solution of ammonia, amine, hydrogen sulfide, ammonium sulfide, ammonium thiocyanate, urea, thiourea, or a mixture thereof and wherein said precipitant solution further contains any remaining catalyst components not added to the non-aqueous solvent in step (1) to the homogeneous solution, and
   (3) drying and calcining the gel slurry to form a homogeneous, crystalline composite metal compound.

3. The method for producing a hydrotreating catalyst of claim 1, wherein said gel slurry is prepared by incorporating the homogeneous solution of the catalyst components (a), ($b_1$) and ($b_2$) dissolved in a non-aqueous solvent with a precipitant solution.

4. The method for producing a hydrotreating catalyst of claim 2, wherein said gel slurry is prepared by incorporating the homogeneous solution of the catalyst component (a) dissolved in a non-aqueous solvent with a precipitant solution containing the catalyst components ($b_1$) and ($b_2$).

5. The method for producing a hydrotreating catalyst of claim 2, wherein said gel slurry is prepared by incorporating the homogeneous solution of the catalyst components (a) and ($b_2$) dissolved in a non-aqueous solvent with a precipitant solution containing the catalyst component ($b_1$).

6. The method for producing a hydrotreating catalyst of claim 2, wherein said gel slurry is prepared by incorporating the homogeneous solution of the catalyst components (a) and ($b_1$) dissolved in a non-aqueous solvent with a precipitant solution containing the catalyst component ($b_2$).

7. The method for producing a hydrotreating catalyst of claim 1, wherein said compounds of aluminum, silicon, phosphorus and boron, soluble in a non-aqueous solvent are an alkoxide, acetylacetonate or carboxylate of each metal.

8. The method for producing a hydrotreating catalyst of claim 2, wherein said compounds of aluminum, silicon, phosphorus and boron, soluble in a non-aqueous solvent are an alkoxide, acetylacetonate or carboxylate of each metal.

9. The method for producing a hydrotreating catalyst of claim 1, wherein said catalyst component (a) is further incorporated with at least one compound selected from the group consisting of magnesium, calcium, zirconium, titanium, thorium, cerium, hafnium and gallium compounds soluble in a non-aqueous solvent.

10. The method for producing a hydrotreating catalyst of claim 2, wherein said catalyst component (a) is further incorporated with at least one compound selected from the group consisting of magnesium, calcium, zirconium, titanium, thorium, cerium, hafnium and gallium compounds soluble in a non-aqueous solvent.

11. The method for producing a hydrotreating catalyst of claim 1, wherein said catalyst component ($b_1$) or ($b_2$) is further incorporated with at least one compound selected from the group consisting of copper, zinc, manganese and rhenium compounds.

12. The method for producing a hydrotreating catalyst of claim 2, wherein said catalyst component ($b_1$) or ($b_2$) is further incorporated with at least one compound selected from the group consisting of copper, zinc, manganese and rhenium compounds.

13. The method for producing a hydrotreating catalyst of claim 1, wherein said catalyst components (a), ($b_1$) and ($b_2$) for preparation of the gel slurry have a solubility product constant of $10^{-2}$ or less in a non-aqueous solvent.

14. The method for producing a hydrotreating catalyst of claim 2, wherein said catalyst components (a), ($b_1$) and ($b_2$) for preparation of the gel slurry have a solubility product constant of $10^{-2}$ or less in a non-aqueous solvent.

15. The method for producing a hydrotreating catalyst of claim 1, wherein total quantity of the metallic elements for salts or compounds that constitute the catalyst components ($b_1$) and ($b_2$) is 0.02 moles to 0.4 moles per mole of the total elements that constitute the hydrotreating catalyst.

16. The method for producing a hydrotreating catalyst of claim 2, wherein total quantity of the metallic elements for salts or compounds that constitute the catalyst components ($b_1$) and ($b_2$) is 0.02 moles to 0.4 moles per mole of the total elements that constitute the hydrotreating catalyst.

17. The method for producing a hydrotreating catalyst of claim 1, wherein said composite metal compound is a mixture of at least one of element, oxide, sulfide, nitride and carbide.

18. The method for producing a hydrotreating catalyst of claim 2, wherein said composite metal compound is a mixture of at least one of element, oxide, sulfide, nitride and carbide.

* * * * *